US012583757B1

(12) United States Patent
Ahmed et al.

(10) Patent No.: US 12,583,757 B1
(45) Date of Patent: Mar. 24, 2026

(54) Ca₂Fe₂O₅/CaFe₂O₄/Fe₂O₃ NANOCOMPOSITE AND METHOD OF PREPARATION THEREOF

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/071,683

(22) Filed: Mar. 5, 2025

(51) Int. Cl.
*C01G 49/06* (2006.01)
*B82Y 30/00* (2011.01)

(52) U.S. Cl.
CPC .............. *C01G 49/06* (2013.01); *B82Y 30/00* (2013.01); *C01P 2002/74* (2013.01); *C01P 2002/76* (2013.01); *C01P 2002/85* (2013.01); *C01P 2004/03* (2013.01); *C01P 2004/04* (2013.01); *C01P 2004/32* (2013.01); *C01P 2004/45* (2013.01); *C01P 2004/64* (2013.01); *C01P 2004/82* (2013.01)

(58) Field of Classification Search
None
See application file for complete search history.

(56) References Cited

U.S. PATENT DOCUMENTS 11,773,025 B2 * 10/2023 Zhang ................... C21C 7/0645
                                                    501/126
2001/0021366 A1 * 9/2001 Matsui ................... B01J 20/041
                                                    423/594.2

FOREIGN PATENT DOCUMENTS

CN        108455678 A      8/2018
CN        117776271 A      3/2024
JP        2006-297324 A    11/2006

OTHER PUBLICATIONS

H. Bhagya Lakshmi, et al., "Synthesis and Characterization of Nano-crystaline CaFe2O4 via Solution Combustion Method from Solid Waste Egg Shells as Source of Calcium", International Journal of Engineering Research and Advanced Technology (IJERAT), vol. 3, Issue 1, Jan. 2017, pp. 21-30.

(Continued)

*Primary Examiner* — Guinever S Gregorio
(74) *Attorney, Agent, or Firm* — Oblon, McClelland, Maier & Neustadt, L.L.P.

(57) ABSTRACT

A dicalcium ferrite (Ca₂Fe₂O₅)/calcium ferrite (CaFe₂O₄)/ iron oxide (Fe₂O₃) nanocomposite material includes ortho-rhombic Ca₂Fe₂O₅ phases, orthorhombic CaFe₂O₄ phases, and rhombohedral Fe₂O₃ phases. The Ca₂Fe₂O₅/CaFe₂O₄/ Fe₂O₃ nanocomposite material has a granular morphology with an average grain size in a range from 200 to 400 nanometers (nm) and the granular morphology includes spherical particles aggregated together forming the granular morphology where the spherical particles have an average particle diameter in a range from 40 to 80 nm.

20 Claims, 5 Drawing Sheets

(56)  References Cited

OTHER PUBLICATIONS

Surbhi Semwal, et al., "Synthesis of Ca—Fe-based heterogeneous catalyst from waste shells and their application for transesterification of *Jatropha* oil", Systems Microbiology and Biomanufacturing, vol. 3, Aug. 10, 2022, pp. 681-692.

* cited by examiner

$Ca_2Fe_2O_5/CaFe_2O_4/Fe_2O_3$ NANOCOMPOSITE AND METHOD OF PREPARATION THEREOF

BACKGROUND

Technical Field

The present disclosure is directed to method of manufacturing a nanocomposite, and more particularly, a method of manufacturing a nanocomposite $Ca_2Fe_2O_5/CaFe_2O_4/Fe_2O_3$ using a combustion method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Current waste management technologies often fail to effectively recycle many types of waste into high-value functional materials, leading to environmental challenges. A large portion of waste, including organic and inorganic materials, ends up in landfills, which contribute to the accumulation of non-biodegradable substances that pollute the environment.

Traditional recycling methods, such as mechanical separation and material recovery, are limited in their ability to process a wide range of waste types and often fail to recover the full value of materials, especially when dealing with complex or mixed waste streams.

In recent years, nanocomposites have emerged as a promising solution to enhance waste recycling and environmental remediation. These materials, composed of nanoparticles integrated into a matrix of polymers or other substances, show remarkable properties such as high surface area, reactivity, and selectivity. Nanocomposites made from waste-derived materials, such as those containing bio-based components or industrial by-products, are being explored for their potential to recycle and convert waste into high-value functional materials. These new nanocomposites can improve waste management processes by providing more efficient, sustainable, and eco-friendly alternatives to traditional methods, offering a promising path toward solving the growing global waste crisis.

Existing studies have explored various calcium ferrites and iron oxides, focusing on their individual phases and properties. Calcium ferrites such as dicalcium ferrite $(Ca_2Fe_2O_5)$ and calcium ferrite $(CaFe_2O_4)$ have been synthesized using complex and costly methods, while hematite iron oxide $(Fe_2O_3)$ has been widely studied for its catalytic and adsorption applications. However, no prior work has successfully integrated these phases into a single nanocomposite, especially through an eco-friendly combustion method that utilizes waste.

Each of the aforementioned synthesis methods suffers from one or more drawbacks hindering their adoption. Accordingly, it is one object of the present disclosure to provide a synthesis method and system that may circumvent the drawbacks, such as complexity, high cost, lack of multi-phase integration and nanoscale precision, of the materials known in the art.

SUMMARY

In an exemplary embodiment, a $Ca_2Fe_2O_5/CaFe_2O_4/Fe_2O_3$ nanocomposite material is described. The $Ca_2Fe_2O_5/$ $CaFe_2O_4/Fe_2O_3$ nanocomposite material includes orthorhombic dicalcium ferrite $(Ca_2Fe_2O_5)$ phases, orthorhombic calcium ferrite $(CaFe_2O_4)$ phases and rhombohedral iron oxide $(Fe_2O_3)$ phases. The $Ca_2Fe_2O_5/CaFe_2O_4/Fe_2O_3$ nanocomposite material has a granular morphology with an average grain size in a range from 200 to 400 nanometers (nm). The granular morphology includes spherical particles aggregated together forming the granular morphology. The spherical particles have an average particle diameter in a range from 40 to 80 nm.

In some embodiments, the average grain size of the $Ca_2Fe_2O_5/CaFe_2O_4/Fe_2O_3$ nanocomposite is in a range from 250 to 350 nm.

In some embodiments, the average grain size of the $Ca_2Fe_2O_5/CaFe_2O_4/Fe_2O_3$ nanocomposite is in a range from 290 to 310 nm.

In some embodiments, the spherical particles of the $Ca_2Fe_2O_5/CaFe_2O_4/Fe_2O_3$ nanocomposite have an average particle diameter in a range from 50 to 70 nm.

In some embodiments, the spherical particles of the $Ca_2Fe_2O_5/CaFe_2O_4/Fe_2O_3$ nanocomposite have an average particle diameter in a range from 55 to 65 nm.

In some embodiments, the $Ca_2Fe_2O_5/CaFe_2O_4/Fe_2O_3$ nanocomposite material has an oxygen content in a range from 35 to 65 atomic % (at. %), an iron content in a range from 25 to 45 at. %, and a calcium content in a range from 5 to 25 at. %.

In some embodiments, the $Ca_2Fe_2O_5/CaFe_2O_4/Fe_2O_3$ nanocomposite material has an oxygen content in a range from 40 to 60 at. %, an iron content in a range from 30 to 40 at. %, and a calcium content in a range from 10 to 20 at. %.

In some embodiments, the $Ca_2Fe_2O_5/CaFe_2O_4/Fe_2O_3$ nanocomposite material has an oxygen content in a range from 45 to 55 at. %, an iron content in a range from 32 to 37 at. %, and a calcium content in a range from 14 to 18 at. %.

In some embodiments, the $Ca_2Fe_2O_5/CaFe_2O_4/Fe_2O_3$ nanocomposite material has an average crystallite size in a range from 40 to 80 nm.

In some embodiments, the $Ca_2Fe_2O_5/CaFe_2O_4/Fe_2O_3$ nanocomposite material has an average crystallite size in a range from 50 to 70 nm.

In some embodiments, the $Ca_2Fe_2O_5/CaFe_2O_4/Fe_2O_3$ nanocomposite material has an average crystallite size in a range from 55 to 65 nm.

In another exemplary embodiment, a method of producing the $Ca_2Fe_2O_5/CaFe_2O_4/Fe_2O_3$ nanocomposite material is described. The method includes dissolving eggshell waste in concentrated nitric acid $(HNO_3)$ to form a calcium solution. The method further includes dissolving tuna can waste in concentrated $HNO_3$ to form an iron solution. The method further includes adding the calcium solution to the iron solution and stirring to form a reaction mixture. The method further includes adding a dextrose monohydrate solution to the reaction mixture and stirring at 150 degrees Celsius (° C.) until a solid is formed. The method further includes calcining the solid at a temperature in a range from 600 to 800° C. for 1 to 5 hours.

In some embodiments, the concentration of eggshell waste in the calcium solution is in a range from 100 to 300 gram per liter (g/L).

In some embodiments, the concentration of tuna can waste in the iron solution is in a range from 100 to 300 g/L.

In some embodiments, the concentration of tuna can waste in the iron solution is 200 g/L.

In some embodiments, the concentration of dextrose monohydrate in the dextrose monohydrate solution is in a range from 50 to 150 g/L.

In some embodiments, the solid is calcined at a temperature in a range from 650 to 750° C.

In some embodiments, the solid is calcined at a temperature of 700° C.

In some embodiments, the solid is calcined for 2 to 4 hours.

In some embodiments, the solid is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
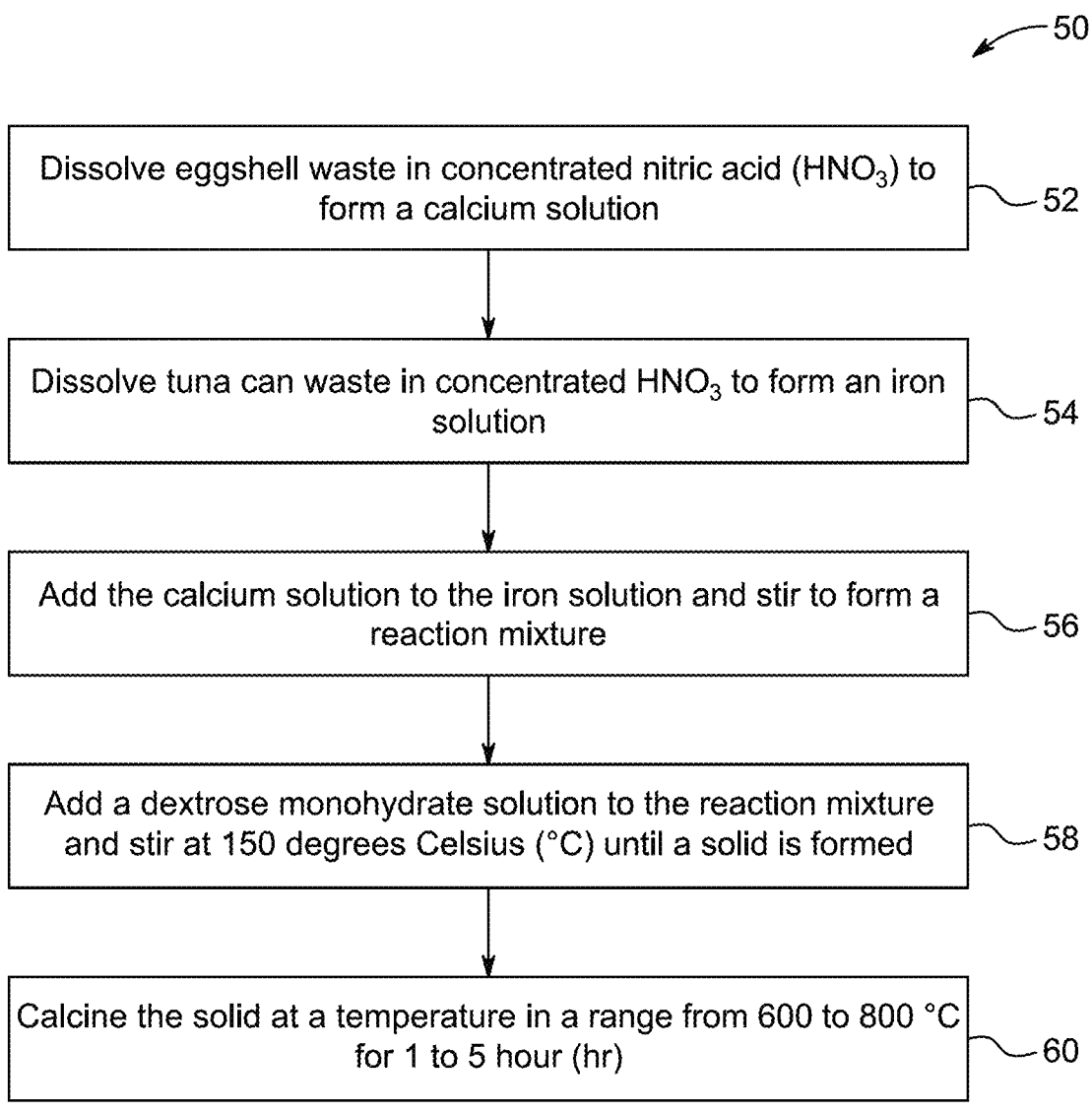
FIG. 1A is a schematic diagram of a flow chart of a method for producing dicalcium ferrite ($Ca_2Fe_2O_5$)/calcium ferrite ($CaFe_2O_4$)/iron oxide ($Fe_2O_3$) nanocomposite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'particle' refers to a small object that acts as a whole unit with regard to its transport and properties.

As used herein, the term 'nanocomposite' refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the disclosure includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC) or any combination thereof.

As used herein, the term 'nanoparticles (NPs)' refers to particles having a particle size of 1 nanometer (nm) to 500 nm within the scope of the present disclosure. The NPs may exist in various morphological shapes, such as nanotubes, nanowires, nanospheres, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nanourchins, nanoflowers, etc., and mixtures thereof.

As used herein, the term 'room temperature' refers to a temperature range of '23 degrees Celsius (° C.)+2° C. in the present disclosure. As used herein, 'ambient conditions' means the temperature and pressure of the surroundings in which the substance, composition or article is located.

As used herein the term 'disposed' refers to being positioned, placed, deposited, arranged or distributed in a particular manner.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, including for crystalline materials.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers.

Aspects of this disclosure pertain to a nanocomposite material of $Ca_2Fe_2O_5/CaFe_2O_4/Fe_2O_3$ nanocomposite material from wastes fabricated through an eco-friendly and cost-effective combustion method using calcium- and iron-rich waste materials such as eggshell and tuna can waste. The method of present disclosure provides a unique solution by transforming waste into an innovative nanocomposite material with enhanced structural and morphological properties. The nanocomposite material of the present disclosure exhibits nanoscale dimensions and uniform particle distribution, making it highly suitable for advanced applications.

A nanocomposite material of $Ca_2Fe_2O_5/CaFe_2O_4/Fe_2O_3$ nanocomposite material is described. The $Ca_2Fe_2O_5/CaFe_2O_4/Fe_2O_3$ nanocomposite material includes an orthorhombic $Ca_2Fe_2O_5$ phase, an orthorhombic $CaFe_2O_4$ phase, and a rhombohedral $Fe_2O_3$ phase. $Ca_2Fe_2O_5$ exhibits mixed oxidation states of iron, influencing electrical and magnetic properties; $CaFe_2O_4$ is a semiconductor material, and $Fe_2O_3$ contributes to optical, magnetic, and catalytic behavior.

The $Ca_2Fe_2O_5/CaFe_2O_4/Fe_2O_3$ nanocomposite material has a granular morphology with an average grain size in a range from 100 to 500 nm, preferably 200 to 400 nm, preferably 205 to 395 nm, preferably 210 to 390 nm, preferably 215 to 385 nm, preferably 220 to 380 nm, preferably 225 to 375 nm, preferably 230 to 370 nm, preferably 235 to 365 nm, preferably 240 to 360 nm, preferably 245 to 355 nm, preferably 250 to 350 nm, preferably 255 to 345 nm, preferably 260 to 340 nm, preferably 265 to 335 nm, preferably 270 to 330 nm, preferably 275 to 325 nm, preferably 280 to 320 nm, preferably 285 to 315 nm, preferably 290 to 310 nm, preferably 295 to 305 nm, more preferably about 300±5 nm. In a preferred embodiment, the $Ca_2Fe_2O_5/CaFe_2O_4/Fe_2O_3$ nanocomposite material has a granular morphology with an average grain size of about 303.89 nm.

The $Ca_2Fe_2O_5/CaFe_2O_4/Fe_2O_3$ nanocomposite material includes spherical particles aggregated together, forming the granular morphology. The spherical particles have an average particle diameter in a range from 30 to 100 nm, preferably 40 to 80 nm preferably 50 to 70 nm, preferably 55 to 65 nm, preferably about 60±2 nm. In a specific embodiment, the spherical particles have an average particle diameter of about 61.58 nm.

In some embodiments, the $Ca_2Fe_2O_5/CaFe_2O_4/Fe_2O_3$ nanocomposite material has an oxygen content in a range from 30 to 70 at. %, preferably 40 to 60 at. %, preferably 45 to 55 at. %, preferably 46 to 54 at. %, preferably 47 to 53 at. %, preferably 48 to 52 at. %, preferably 48 to 50 at. %, preferably about 48 to 49 at. %. In a preferred embodiment, the $Ca_2Fe_2O_5/CaFe_2O_4/Fe_2O_3$ nanocomposite material has an oxygen content of about 48.9 at. %. In some embodiments, the $Ca_2Fe_2O_5/CaFe_2O_4/Fe_2O_3$ nanocomposite material has an iron content in a range from 20 to 50 at. %, preferably 30 to 40 at. %, preferably 32 to 37 at. %, preferably 32 to 35 at. %, preferably 33 to 35 at. %. In a preferred embodiment, the $Ca_2Fe_2O_5/CaFe_2O_4/Fe_2O_3$ nanocomposite material has an iron content of about 34.8 at. %. In some embodiments, the $Ca_2Fe_2O_5/CaFe_2O_4/Fe_2O_3$ nanocomposite material has a calcium content in a range from 5 to 25 at. %, preferably 10 to 20 at. %, preferably 14 to 18 at. %, preferably 15 to 17 at. %, preferably 16 to 17 at. %. In a preferred embodiment, the $Ca_2Fe_2O_5/CaFe_2O_4/Fe_2O_3$ nanocomposite material has a calcium content of about 16.3 at. %. In one specific embodiment, the $Ca_2Fe_2O_5/CaFe_2O_4/Fe_2O_3$ nanocomposite material has an oxygen content of about 48.9 at. %, iron content of about 34.8 at. %, and calcium content of about 16.3 at. %.

In some embodiments, the $Ca_2Fe_2O_5/CaFe_2O_4/Fe_2O_3$ nanocomposite material has an average crystallite size in a range from 30 to 100 nm, preferably 40 to 80 nm, preferably 50 to 70 nm, preferably 55 to 65 nm, preferably 56 to 64 nm, preferably 57 to 63 nm, preferably 58 to 62 nm, and preferably 59 to 61 nm. In a specific embodiment, the $Ca_2Fe_2O_5/CaFe_2O_4/Fe_2O_3$ nanocomposite material has an average crystallite size of about 60.29 nm.

In one or more embodiments, the $Ca_2Fe_2O_5/CaFe_2O_4/Fe_2O_3$ nanocomposite material has 40 to 70 wt. %, preferably 50 to 60 wt. % $Ca_2Fe_2O_5$, 20 to 40 wt. %, preferably 28 to 35 wt. % $CaFe_2O_4$, and 5 to 20 wt. %, preferably 8 to 14 wt. % $Fe_2O_3$, based on the total weight of the $Ca_2Fe_2O_5/CaFe_2O_4/Fe_2O_3$ nanocomposite material.

In some embodiments, the phase ratios, crystallite size, and surface morphology can be tuned depending on the synthesis method (e.g., sol-gel, hydrothermal, combustion, or sonochemical methods). FIG. 1 illustrates a schematic flow chart of a method 50 of producing the $Ca_2Fe_2O_5/CaFe_2O_4/Fe_2O_3$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes dissolving eggshell waste in concentrated $HNO_3$ to form a calcium solution. Eggshell waste is a byproduct primarily composed of calcium carbonate ($CaCO_3$), which makes up about 95% of the eggshell. Although the description herein provided refers to the use of eggshell waste as a source of calcium carbonate, it may be understood by a person skilled in the art, that other sources of calcium carbonate, such as marine shells, waste from paper industry or industrial waste may also be used.

In an embodiment, the weight-by-volume ratio of the eggshell waste to the concentrated $HNO_3$ is in the range of 1:1 to 1:10, preferably 1:2 to 1:9, preferably 1:3 to 1:8, preferably 1:4 to 1:7, preferably 1:5 to 1:6, more preferably about 1:5. In some embodiments, other acids, such as sulfuric acid, hydrochloric acid, acetic acid, etc., can also be used instead of nitric acid to form the calcium solution. In some embodiments, the concentration of eggshell waste in the calcium solution is in the range of 50 to 500 g/L, preferably 100 to 300 g/L.

At step 54, the method 50 includes dissolving tuna can waste in concentrated $HNO_3$ to form an iron solution. Most tuna cans are made from steel which contains iron). The iron from the tuna can waste can be recovered by dissolving the tuna can waste in concentrated $HNO_3$ to form the iron solution. In an embodiment, the weight-by-volume ratio of the tuna can waste to the concentrated $HNO_3$ is in the range of 1:1 to 1:10, preferably 1:2 to 1:9, preferably 1:3 to 1:8, preferably 1:4 to 1:7, preferably 1:5 to 1:6, more preferably about 1:5. In some embodiments, other acids, such as sulfuric acid, hydrochloric acid, acetic acid, etc., can also be used instead of nitric acid to form the iron solution. In some embodiments, the concentration of tuna can waste in the iron solution is in the range from 50 to 500 g/L, preferably 100 to 300 g/L, preferably 150 to 250 g/L, preferably 200 g/L.

At step 56, the method 50 includes adding the calcium solution to the iron solution and stirring to form a reaction mixture. In this step, calcium nitrate ($Ca(NO_3)_2$) and iron nitrate ($Fe(NO_3)_3$) solutions are mixed and stirred to form the reaction mixture.

At step 58, the method 50 includes adding a dextrose monohydrate solution to the reaction mixture and stirring at 150° C. until a solid is formed. Dextrose monohydrate ($C_6H_{12}O_6 \cdot H_2O$) acts as a fuel, aiding combustion by reducing metal ions and facilitating the synthesis of the nanocomposite. In some embodiments, the concentration of dextrose monohydrate in the dextrose monohydrate solution is in a range from 50 to 150 g/L. Certain alternatives to dextrose monohydrate, include, but are not limited to, urea, citric acid, glycine, sucrose, glucose, polyvinyl alcohol, polyethylene glycol, egg white, ascorbic acid, etc. After adding the dextrose monohydrate solution to the reaction mixture, it is heated to 150° C. to evaporate water and initiate a gel-like precursor formation (solid).

At step 60, the method 50 includes calcining the solid at a temperature in a range from 600 to 800° C. for 1 to 5 h. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50 degrees Celsius/minute (° C./min), preferably up to 40° C./min, preferably up to 30° C./min, preferably up to 20° C./min, preferably up to 10° C./min, preferably up to 3 to 5° C./min. In some embodiments, the calcination process occurs with a ramping temperature of 3-5° C./min at a temperature range of 650 to 750° C., preferably 700° C. In some embodiments, the solid is calcined for 2 to 4 hours, preferably 3 hours.

The following examples are provided solely for illustration and are not to be construed as limitations of the present disclosure, as many variations thereof are possible without departing from the spirit and scope of the present disclosure.

EXAMPLES

The following examples demonstrate a method of manufacturing a nanocomposite ($Ca_2Fe_2O_5/CaFe_2O_4/Fe_2O_3$) including dicalcium ferrite ($Ca_2Fe_2O_5$), calcium ferrite ($CaFe_2O_4$), iron oxide ($Fe_2O_3$). The examples are provided solely for illustration and are not to be construed as limitations of the present disclosure, as many variations thereof are possible without departing from the spirit and scope of the present disclosure.

Figure 1B:
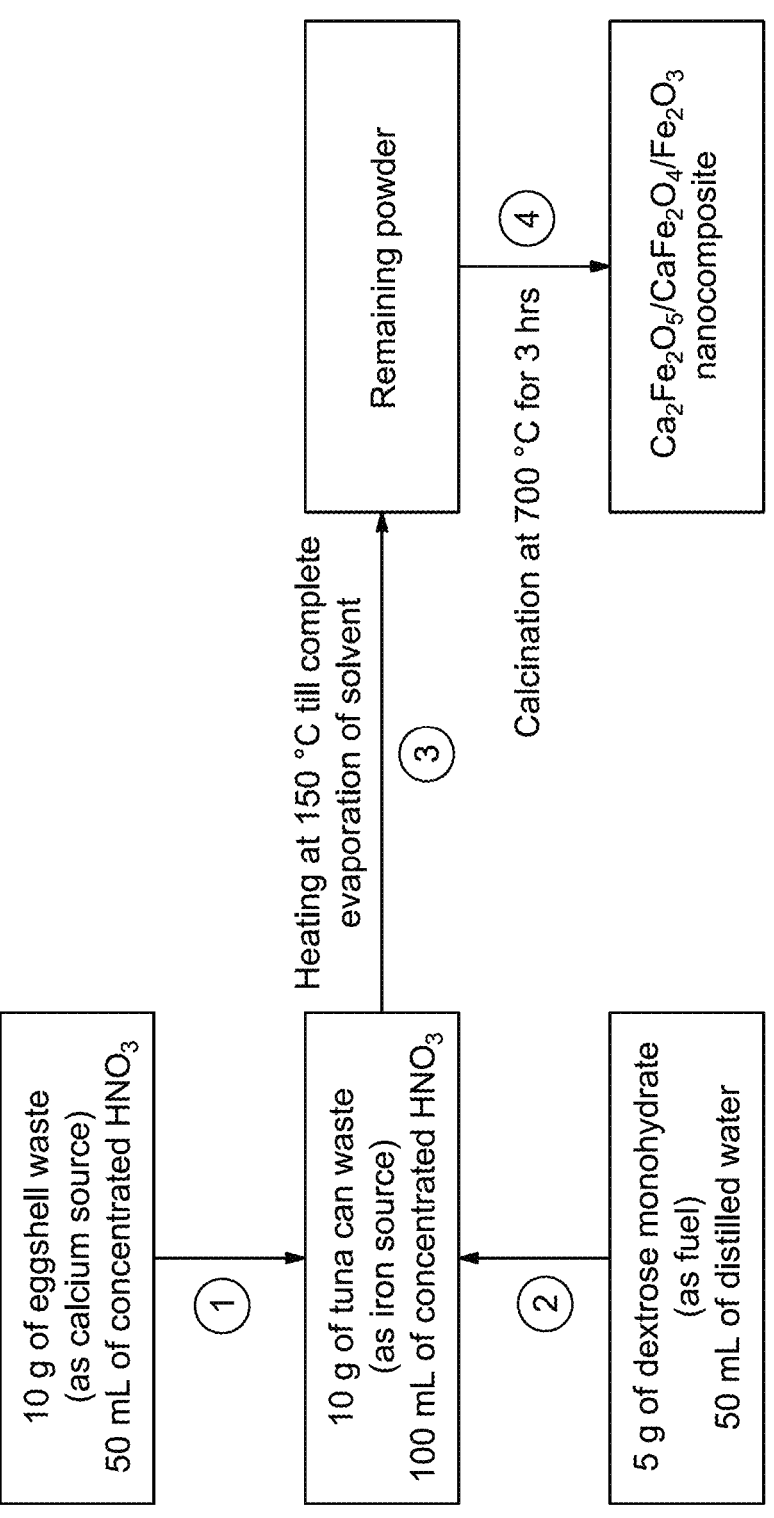
FIG. 1B is an exemplary flow chart of a method of the production of $Ca_2Fe_2O_5/CaFe_2O_4/Fe_2O_3$ nanocomposite, according to certain embodiments.

Example 1: Synthesis of $Ca_2Fe_2O_5/CaFe_2O_4/Fe_2O_3$ Nanocomposite Using Combustion Method According to the present disclosure, the synthesis of the $Ca_2Fe_2O_5/CaFe_2O_4/Fe_2O_3$ nanocomposite was achieved through a combustion method, as illustrated in FIG. 1B. In the first step, 10 grams (g) of eggshell waste (as calcium source) was dissolved in 50 milliliters (mL) of concentrated nitric acid ($HNO_3$). In the second step, 10 grams (g) of tuna can waste (as iron source) was dissolved in 100 mL of concentrated $HNO_3$. In the third step, 5 g of dextrose monohydrate (as fuel) was dissolved in 50 mL of distilled water. The calcium solution was added to the iron solution with continuous stirring for 5 minutes (min). Subsequently, the fuel solution was added to the mixture, and the resulting solution was stirred continuously at 150 degrees Celsius (° C.) until the solvent completely evaporated. The resulting powder was then calcined at 700° C. for 3 hours (hrs) to produce the $Ca_2Fe_2O_5/CaFe_2O_4/Fe_2O_3$ nanocomposite.

Example 2: Characterization

X-ray diffraction (XRD) was employed to identify the crystalline phases present in the nanocomposite. Scanning electron microscopy (SEM) provided detailed insights into the surface morphology and particle size distribution of the nanocomposite. Transmission electron microscopy (TEM) further complemented the morphological analysis by offering high-resolution images of the nanostructure. Energy-dispersive X-ray spectroscopy (EDX) was used to confirm the elemental composition of the nanocomposite, leading to the presence of the intended materials.

Figure 2:
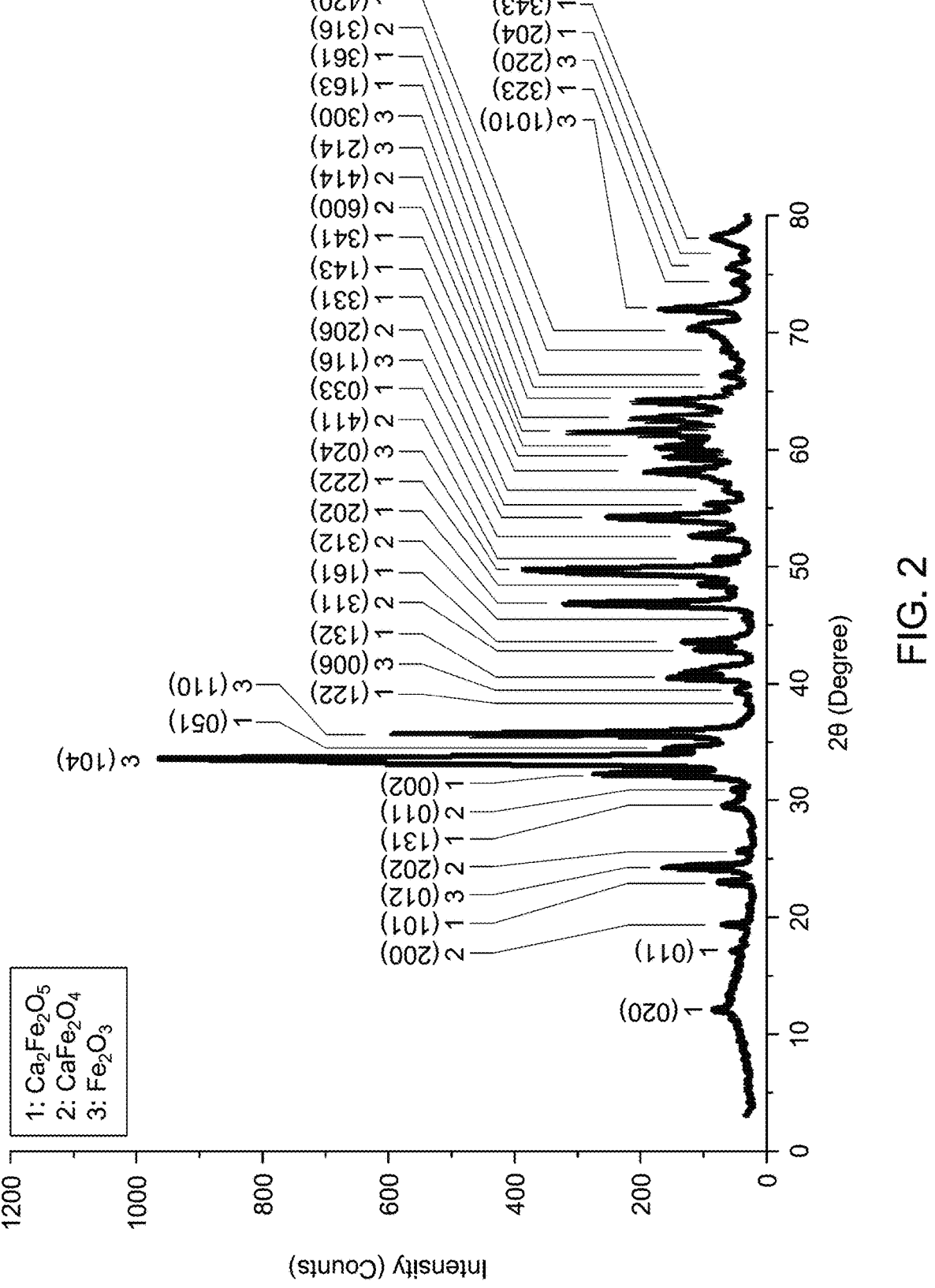
FIG. 2 shows an X-ray diffraction (XRD) pattern of synthesized nanocomposite, according to certain embodiments.

The X-ray diffraction (XRD) pattern of the synthesized nanocomposite, shown in FIG. 2, demonstrates the distinct peaks corresponding to the individual phases of the components. The structural and crystallographic properties of the synthesized nanocomposite components are detailed in Table 1. The orthorhombic dicalcium ferrite ($Ca_2Fe_2O_5$) phase, identified using JCPDS card No. 00-047-1744, shows characteristic diffraction peaks at 12.06, 16.99, 22.87, 29.48, 32.10, 34.31, 38.08, 40.60, 43.43, 46.69, 48.48, 52.57, 56.45, 58.02, 59.28, 64.95, 66.32, 70.41, 74.18, 76.59, and 78.07, corresponding to the Miller indices (020), (011), (101), (131), (002), (051), (122), (132), (161), (202), (222), (033), (331), (143), (341), (163), (361), (420), (323), (204), and (343), respectively. The orthorhombic calcium ferrite ($CaFe_2O_4$) phase, referenced with JCPDS card No. 00-065-0678, exhibits diffraction peaks at 19.30, 25.49, 30.73, 42.81, 45.44, 50.58, 55.19, 60.12, 61.38, and 68.42, corresponding to the Miller indices (200), (202), (011), (311), (312), (411), (206), (600), (414), and (316), respectively. The rhombohedral hematite ($Fe_2O_3$) phase, identified with JCPDS card No. 01-087-1166, shows diffraction peaks at 24.13, 33.47, 35.68, 39.34, 49.52, 54.14, 62.44, 64.00, 71.88, and 75.55, corresponding to the Miller indices (012), (104), (110), (006), (024), (116), (214), (300), (1 0 10), and (220), respectively. The average crystallite size of the synthesized nanocomposite is approximately 60.29 nanometers (nm). The overall results confirm the successful synthesis of the orthorhombic $Ca_2Fe_2O_5$, orthorhombic $CaFe_2O_4$, and rhombohedral $Fe_2O_3$ phases within the nanocomposite.

TABLE 1

Structural and crystallographic properties of the synthesized nanocomposite components.

| Components of synthesized nanocomposite | | | | Average crystallite size of synthesized nanocomposite |
| --- | --- | --- | --- | --- |
| Phase | Chemical name | Card No. | Crystal system | (nm) |
| $Ca_2Fe_2O_5$ | Dicalcium Ferrite | JCPDS-00-047-1744 | Orthorhombic | 60.29 |
| $CaFe_2O_4$ | Calcium Ferrite | JCPDS-00-065-0678 | Orthorhombic | |
| $Fe_2O_3$ | Hematite | JCPDS-01-087-1166 | Rhombohedral | |

Figure 3:
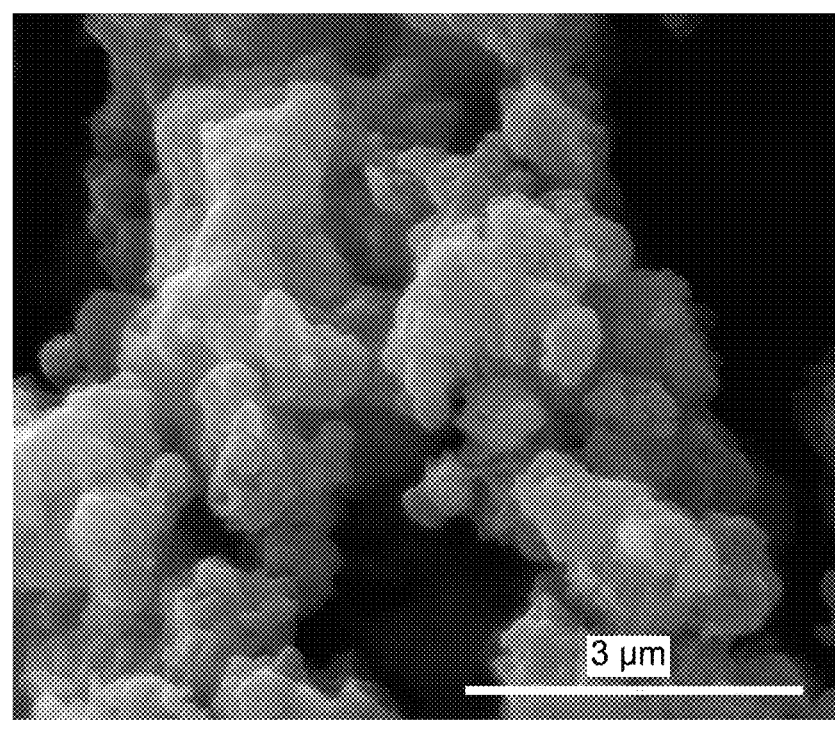
FIG. 3 is a scanning electron microscope (SEM) image of the synthesized nanocomposite, according to certain embodiments.

The scanning electron microscope (SEM) image of the synthesized nanocomposite is shown in FIG. 3 which reveals a porous and irregular morphology characterized by agglomerated particles with uneven distribution. The predominant shapes observed in the SEM image are spherical clusters and irregular aggregates, which suggest a high surface area suitable for potential applications in adsorption or catalysis. The nanostructures exhibit a consistent granular texture, and the average grain size of the particles is calculated to be 303.89 nm. These morphological features highlight the successful synthesis of the $Ca_2Fe_2O_5/CaFe_2O_4/Fe_2O_3$ nanocomposite with desirable structural characteristics.

Figure 4:
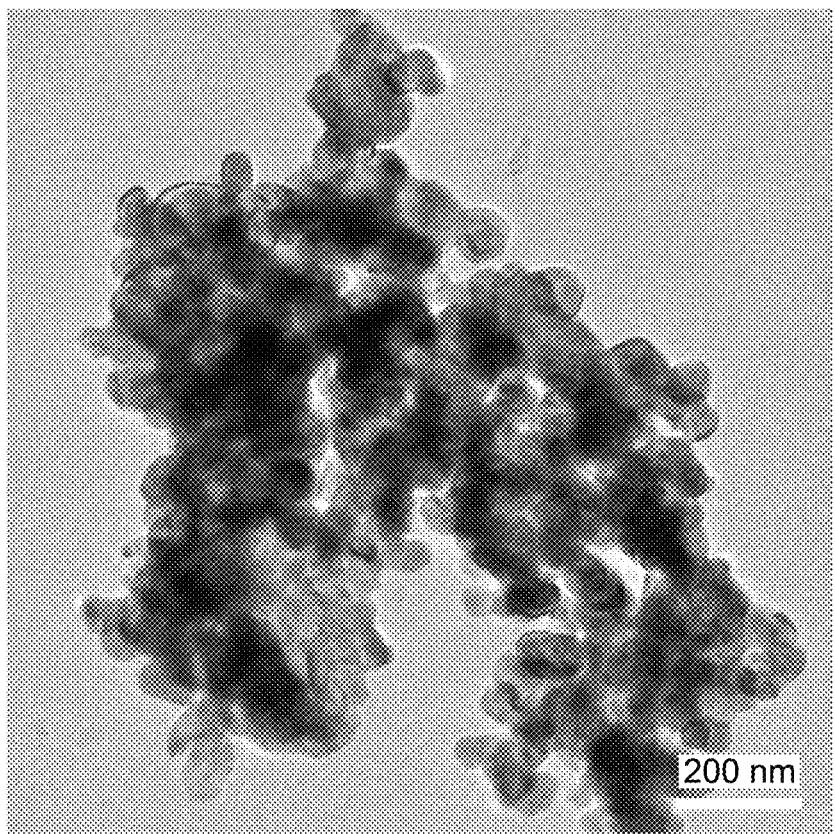
FIG. 4 is a high-resolution transmission electron microscope (HRTEM) image of the synthesized nanocomposite, according to certain embodiments.

High-resolution transmission electron microscope (HR-TEM) image of the synthesized nanocomposite is shown in FIG. 4 which reveals the detailed nanostructural features of the nanocomposite. The image demonstrates the presence of spherical and quasi-spherical nanoparticles, along with irregularly shaped aggregates, forming a densely packed arrangement. The well-defined nanoscale features highlight the successful synthesis of the composite with uniform particle distribution and minimal defects. The average particle diameter of the synthesized nanocomposite is 61.58 nm, confirming the nanoscale nature of the nanocomposite and its potential suitability for applications requiring high surface area and enhanced reactivity. These observations validate the structural integrity and morphological consistency of the synthesized nanocomposite.

Figure 5:
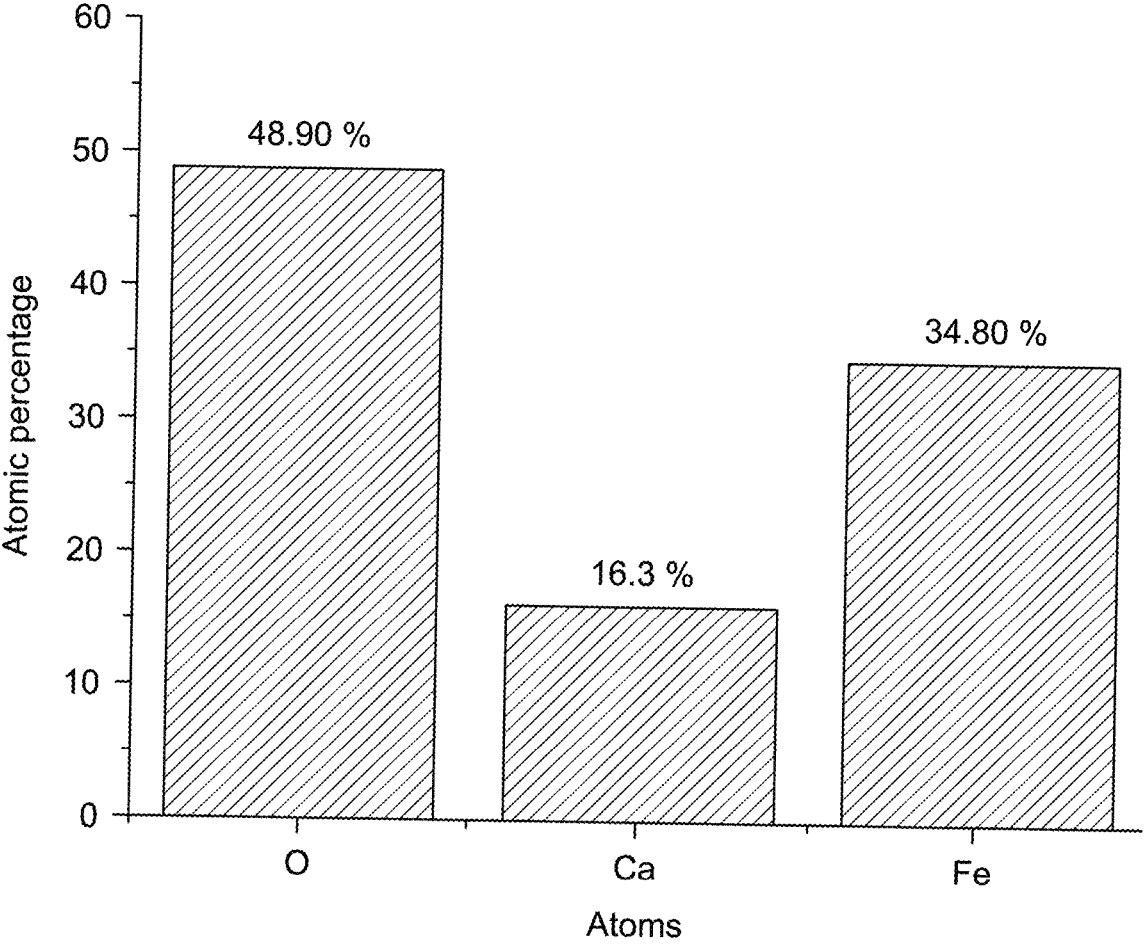
FIG. 5 is a graph depicting distribution of atomic percentages of elements in the synthesized nanocomposite as determined by energy dispersive X-ray spectroscopy (EDX), according to certain embodiments.

FIG. 5 illustrates the distribution of atomic percentages of elements in the synthesized nanocomposite as determined by energy dispersive X-ray spectroscopy (EDX). The analysis confirms the presence of oxygen, calcium, and iron as the primary elements in the nanocomposite. Oxygen exhibits the highest atomic percentage at 48.90 percent (%), followed by iron at 34.80%, and calcium at 16.30%. These values confirm the successful incorporation of the intended elemental composition during the synthesis process, consistent with the theoretical stoichiometry of the $Ca_2Fe_2O_5/CaFe_2O_4/Fe_2O_3$ nanocomposite. This elemental analysis further validates the purity and structural integrity of the synthesized nanocomposite.

In the present disclosure, the $Ca_2Fe_2O_5/CaFe_2O_4/Fe_2O_3$ nanocomposite is synthesized through the combustion method utilizing eggshell waste as a calcium source and tuna can waste as an iron source, providing a sustainable approach to waste valorization and material fabrication. The use of an eco-friendly and cost-effective combustion synthesis process involves the dissolution of eggshell and tuna can waste in nitric acid, followed by the incorporation of dextrose monohydrate as a fuel and calcination at 700° C. for 3 hrs to produce the $Ca_2Fe_2O_5/CaFe_2O_4/Fe_2O_3$ nanocomposite. The $Ca_2Fe_2O_5/CaFe_2O_4/Fe_2O_3$ nanocomposite is characterized by the coexistence of an orthorhombic $Ca_2Fe_2O_5$ phase, an orthorhombic $CaFe_2O_4$ phase, and a rhombohedral $Fe_2O_3$ phase, as confirmed by X-ray diffraction, with an average crystallite size of 60.29 nm. The $Ca_2Fe_2O_5/CaFe_2O_4/Fe_2O_3$ nanocomposite exhibits a porous and irregular morphology with agglomerated spherical clusters and aggregates, as observed in scanning electron microscopy, with an average grain size of 303.89 nm. The nanoscale uniformity of the $Ca_2Fe_2O_5/CaFe_2O_4/Fe_2O_3$ nanocomposite demonstrated through HR-TEM, showing spherical and quasi-spherical particles with an average particle diameter of 61.58 nm. The elemental composition of the synthesized nanocomposite includes oxygen at 48.90%, iron at 34.80%, and calcium at 16.30%, as determined by EDX, confirming the successful incorporation of the intended elements. The $Ca_2Fe_2O_5/CaFe_2O_4/Fe_2O_3$ nanocomposite may be used as an efficient adsorbent for removing pollutants from aqueous media, as well as a catalyst in chemical reactions, benefitting from its unique phase composition and enhanced surface properties for catalytic activity.

Numerous modifications and variations of the present disclosure are possible in light of the above teachings. It is therefore to be understood that within the scope of the appended claims, the disclosure may be practiced otherwise than as specifically described herein.

The invention claimed is:

1. A $Ca_2Fe_2O_5/CaFe_2O_4/Fe_2O_3$ nanocomposite material, comprising:
   an orthorhombic $Ca_2Fe_2O_5$ phase;
   an orthorhombic $CaFe_2O_4$ phase; and
   a rhombohedral $Fe_2O_3$ phase,
   wherein the $Ca_2Fe_2O_5/CaFe_2O_4/Fe_2O_3$ nanocomposite material has a granular morphology with an average grain size in a range from 200 to 400 nanometers (nm),
   wherein the granular morphology comprises spherical particles aggregated together forming the granular morphology,
   wherein the spherical particles have an average particle diameter in a range from 40 to 80 nm, and
   wherein the $Ca_2Fe_2O_5/CaFe_2O_4/Fe_2O_3$ nanocomposite material has an oxygen content in a range from 35 to 65 atomic % (at. %), an iron content in a range from 25 to 45 at. %, and a calcium content in a range from 5 to 25 at. %.

2. The $Ca_2Fe_2O_5/CaFe_2O_4/Fe_2O_3$ nanocomposite material of claim 1, wherein the average grain size is in a range from 250 to 350 nm.

3. The $Ca_2Fe_2O_5/CaFe_2O_4/Fe_2O_3$ nanocomposite material of claim 2, wherein the average grain size is in a range from 290 to 310 nm.

4. The $Ca_2Fe_2O_5/CaFe_2O_4/Fe_2O_3$ nanocomposite material of claim 1, wherein the spherical particles have an average particle diameter in a range from 50 to 70 nm.

5. The $Ca_2Fe_2O_5/CaFe_2O_4/Fe_2O_3$ nanocomposite material of claim 4, wherein the spherical particles have an average particle diameter in a range from 55 to 65 nm.

6. The $Ca_2Fe_2O_5/CaFe_2O_4/Fe_2O_3$ nanocomposite material of claim 1, wherein the $Ca_2Fe_2O_5/CaFe_2O_4/Fe_2O_3$ nanocomposite material has an oxygen content in a range from 40 to 60 at. %, an iron content in a range from 30 to 40 at. %, and a calcium content in a range from 10 to 20 at. %.

7. The $Ca_2Fe_2O_5/CaFe_2O_4/Fe_2O_3$ nanocomposite material of claim 6, wherein the $Ca_2Fe_2O_5/CaFe_2O_4/Fe_2O_3$ nanocomposite material has an oxygen content in a range from 45 to 55 at. %, an iron content in a range from 32 to 37 at. %, and a calcium content in a range from 14 to 18 at. %.

8. The $Ca_2Fe_2O_5/CaFe_2O_4/Fe_2O_3$ nanocomposite material of claim 1, wherein $Ca_2Fe_2O_5/CaFe_2O_4/Fe_2O_3$ nanocomposite material has an average crystallite size in a range from 40 to 80 nm.

9. The $Ca_2Fe_2O_5/CaFe_2O_4/Fe_2O_3$ nanocomposite material of claim 8, wherein $Ca_2Fe_2O_5/CaFe_2O_4/Fe_2O_3$ nanocomposite material has an average crystallite size in a range from 50 to 70 nm.

10. The $Ca_2Fe_2O_5/CaFe_2O_4/Fe_2O_3$ nanocomposite material of claim 9, wherein $Ca_2Fe_2O_5/CaFe_2O_4/Fe_2O_3$ nanocomposite material has an average crystallite size in a range from 55 to 65 nm.

11. The method of claim 1, wherein the $Ca_2Fe_2O_5/CaFe_2O_4/Fe_2O_3$ nanocomposite material has 40 to 70 wt. % $Ca_2Fe_2O_5$, 20 to 40 wt. % $CaFe_2O_4$, and 5 to 20 wt. % $Fe_2O_3$, based on the total weight of the $Ca_2Fe_2O_5/CaFe_2O_4/Fe_2O_3$ nanocomposite material.

12. A method of producing the $Ca_2Fe_2O_5/CaFe_2O_4/Fe_2O_3$ nanocomposite material of claim 1, comprising:

dissolving eggshell waste in concentrated nitric acid ($HNO_3$) to form a calcium solution;

dissolving tuna can waste in concentrated $HNO_3$ to form an iron solution;

adding the calcium solution to the iron solution and stirring to form a reaction mixture;

adding a dextrose monohydrate solution to the reaction mixture and stirring at 150 degrees Celsius (° C.) until a solid is formed; and calcining the solid at a temperature in a range from 600 to 800° C. for 1 to 5 hour (hr).

13. The method of claim 12, wherein the concentration of eggshell waste in the calcium solution is in a range from 100 to 300 gram per liter (g/L).

14. The method of claim 12, wherein the concentration of tuna can waste in the iron solution is in a range from 100 to 300 g/L.

15. The method of claim 14, wherein the concentration of tuna can waste in the iron solution is 200 g/L.

16. The method of claim 12, wherein the concentration of dextrose monohydrate in the dextrose monohydrate solution is in a range from 50 to 150 g/L.

17. The method of claim 12, wherein the solid is calcined at a temperature in a range from 650 to 750° C.

18. The method of claim 17, wherein the solid is calcined at a temperature of 700° C.

19. The method of claim 12, wherein the solid is calcined for 2 to 4 hours.

20. The method of claim 19, wherein the solid is calcined for 3 hours.

\* \* \* \* \*